(No Model.)

G. W. STARTZMAN & E. C. CRAIN.
FERTILIZER DISTRIBUTER.

No. 347,838.      Patented Aug. 24, 1886.

on line x—x

Attest.

Inventors
G. W. Startzman
E. C. Crain
By their Atty
P. T. Dodge

UNITED STATES PATENT OFFICE.

GEORGE W. STARTZMAN AND EDMUND C. CRAIN, OF SPRINGFIELD, OHIO, ASSIGNORS TO P. P. MAST & COMPANY, OF SAME PLACE.

FERTILIZER-DISTRIBUTER.

SPECIFICATION forming part of Letters Patent No. 347,838, dated August 24, 1886.

Application filed March 15, 1886. Serial No. 195,355. (No model.)

*To all whom it may concern:*

Be it known that we, GEORGE W. STARTZMAN and EDMUND C. CRAIN, of Springfield, in the county of Clark and State of Ohio, have invented certain Improvements in Fertilizer-Distributers, of which the following is a specification.

This invention has reference to that class of fertilizer-distributers in which a horizontal rotating disk is employed to effect the distribution.

The aim of the invention is to secure the uniform delivery of the material to the upper feeding-surface of the disk; and to this end it consists, essentially, in combining with the disk an upright revolving spindle provided with radial arms, disks, or other projections to agitate the material.

Our device is designed more especially for use in connection with those distributers having the disk composed of glass and mounted on top of the driving-wheel, and we have therefore shown in the accompanying drawings the details of construction best adapted for this form of feeder; but it is to be understood that the details may be modified at will, and that the improvement may be applied to feeders having metallic disks formed integral with the wheel.

As the hoppers and the mechanism for driving the feeder may be of ordinary construction, and form no part of this invention, it is deemed unnecessary to illustrate them in the accompanying drawings.

Figure 1:
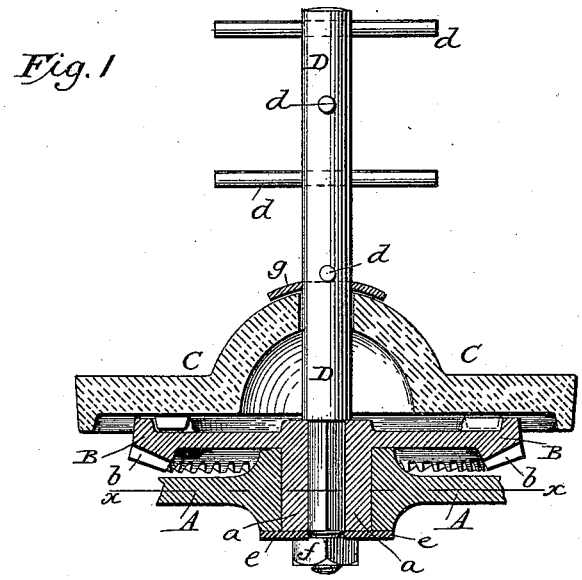
Figure 2:
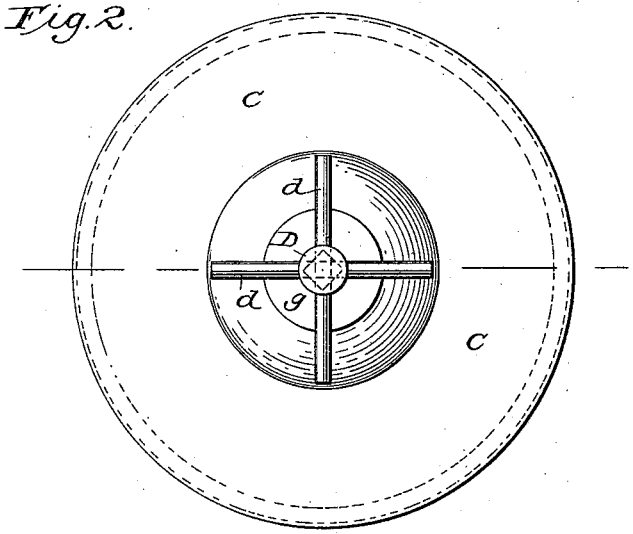
Figure 3:
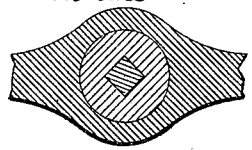

Referring to the drawings, Figure 1 represents a vertical central section through the feed-disk and the adjacent parts, with our improvements applied thereto. Fig. 2 represents a top plan view of the same. Fig. 3 is a horizontal section on the line *x x*.

In the drawings, A represents a portion of the supporting-frame; B, a horizontal gear-wheel, having at the center a depending hub or journal, *a*, mounted in a recess in the frame. This gear-wheel is provided, as usual, on the under side with peripheral teeth *b*, through which it receives motion, and on the upper side with studs or other equivalents to engage the distributing-disk.

C represents the glass distributer-disk, of the ordinary form, seated on top of the driving and supporting wheel and engaged or interlocked therewith, so as to receive motion therefrom.

The foregoing parts are substantially of ordinary construction.

In applying our improvement we provide a vertical spindle, D, having at the upper end horizontal arms *d*, or equivalent projections, adapted to agitate the mass of material by which they will be surrounded. This spindle is passed downward loosely through a central hole in the glass disk and its lower end secured centrally within the driving-wheel, so as to revolve therewith.

The connection between the spindle and wheel may be of any suitable character; but we prefer to form a square or other angular neck on the lower end of the spindle, and to pass the same downward through a corresponding hole in the center of the wheel, the lower extremity being threaded and projected below the wheel, as shown. Around this lower projecting end we apply a washer, *e*, and fasten the same in place by a nut, *f*. This washer is of such size as to extend beyond the hub of the wheel and bear against the under side of the frame A, as shown in Fig. 1. The nut and washer thus applied serve the double purpose of confining the spindle within the wheel and of confining the wheel within the frame, the wheel being free to revolve in the latter, while the spindle is compelled to rotate with the wheel.

Around the spindle above the feeding-disk, which is commonly raised at the center, we apply a plate or washer, *g*, which is fitted closely to the spindle for the purpose of preventing the fertilizing material from working downward around the spindle through the central opening in the disk. This washer *g* may be fastened rigidly to the spindle, if desired, or it may be held in place by means of the agitator-arm *d*, passing above it, as shown in the drawings. This washer also serves to prevent the fertilizer-plate from being lifted accidentally out of engagement with its driving-wheel.

The various parts are so fitted that when in action the spindle and its attachments apply no strain to the disk, which is therefore free from the liability of breakage which would otherwise exist.

In practice it is found that an agitator such as herein described will maintain the mass of material in the hopper in a free or loose condition, so that it will rest at all times in a free condition on the upper surface of the distributing-disk, which is consequently enabled to effect a uniform delivery.

Having thus described our invention, what we claim is—

1. In combination with the horizontal driving-wheel and the horizontal distributer-disk, the vertical spindle secured to the wheel and extended through and above the disk, with projecting arms or agitators at the upper end.

2. The combination of the supporting-frame, the driving-wheel supported thereby, the distributer-disk, the agitator-spindle, and nut and washer applied, substantially as described, for the double purpose of holding the wheel and the spindle in position.

3. The combination of the horizontal driving-wheel, the horizontal distributer-disk, the agitator-spindle secured to the wheel and extending through the disk, and the washer $g$, applied to the spindle above the disk.

4. The combination of the driving-wheel, the distributer-disk, the spindle secured to the wheel, and the washer $g$, secured to the spindle above the disk, whereby the disk is held in engagement with the wheel.

In testimony whereof we hereunto set our hands, this 16th day of December, 1885, in the presence of two attesting witnesses.

GEO. W. STARTZMAN.
EDMUND C. CRAIN.

Witnesses:
C. C. KIRKPATRICK,
W. G. MAITLAND.